(12) United States Patent
Tao

(10) Patent No.: US 11,988,289 B2
(45) Date of Patent: May 21, 2024

(54) BYPASS VALVE AND WATER PURIFIER

(71) Applicants: Solventum Intellectual Properties Company, Maplewood, MN (US); Jun Tao, Shanghai (CN)

(72) Inventor: Jun Tao, Shanghai (CN)

(73) Assignee: Solventum Intellectual Properties Company, Maplewood, MN (US)

( * ) Notice: Subject to any disclaimer, the term of this patent is extended or adjusted under 35 U.S.C. 154(b) by 301 days.

(21) Appl. No.: 17/276,003

(22) PCT Filed: Oct. 18, 2019

(86) PCT No.: PCT/IB2019/058924
§ 371 (c)(1),
(2) Date: Mar. 12, 2021

(87) PCT Pub. No.: WO2020/084424
PCT Pub. Date: Apr. 30, 2020

(65) Prior Publication Data
US 2022/0042610 A1 Feb. 10, 2022

(30) Foreign Application Priority Data
Oct. 26, 2018 (CN) .......................... 201811259219.8

(51) Int. Cl.
*F16K 11/076* (2006.01)
*C02F 1/28* (2023.01)
(Continued)

(52) U.S. Cl.
CPC ............ *F16K 11/076* (2013.01); *C02F 1/283* (2013.01); *C02F 1/42* (2013.01); *C02F 1/441* (2013.01);
(Continued)

(58) Field of Classification Search
CPC . F16K 11/076; F16K 11/0708; B01D 35/147; Y10T 137/87611; Y10T 137/87627
See application file for complete search history.

(56) References Cited

U.S. PATENT DOCUMENTS 2,953,165 A * 9/1960 Reynolds ............ F16K 27/0263
137/892
4,056,124 A * 11/1977 Goldsmith ............ F16K 11/078
137/625.17
(Continued)

FOREIGN PATENT DOCUMENTS

| CN | 2164408 | 5/1994 |
|---|---|---|
| CN | 2301442 | 12/1998 |

(Continued)

OTHER PUBLICATIONS

International Search Report for PCT International Application No. PCT/IB2019/058924, dated Jan. 23, 2020, 3 pages.

*Primary Examiner* — Reinaldo Sanchez-Medina

(57) ABSTRACT

The present invention discloses a bypass valve and a water purifier comprising the bypass valve. The bypass valve comprises a valve housing and a valve core disposed in an inner space of the valve housing and capable of rotating in the inner space around an axial direction. The valve core comprises a first inlet and a first outlet disposed at intervals in an axial direction, a first annular seal fitted on an outer side surface of the valve core between the first inlet and the first outlet, and a first channel disposed within the valve core and communicating with the first inlet and the first outlet. The valve housing comprises a first opening and a second opening disposed at intervals in an axial direction, the inner space communicating with the first opening and the second opening, and a bypass opening provided on a side wall of the valve housing between the first opening and the second opening and communicating with the inner space and an (Continued)

outer space outside the valve housing. The bypass opening and the first circular seal are configured in such a manner that, when the valve core rotates, the first annular seal is capable of partitioning the bypass opening into two parts, and an axial position of a part of the first annular seal in contact with the bypass opening varies with the rotation of the valve core.

21 Claims, 15 Drawing Sheets

(51) Int. Cl.
    *C02F 1/42*     (2023.01)
    *C02F 1/44*     (2023.01)

(52) U.S. Cl.
    CPC ........ *C02F 1/444* (2013.01); *C02F 2201/005* (2013.01); *C02F 2301/043* (2013.01); *C02F 2307/10* (2013.01)

(56) References Cited

U.S. PATENT DOCUMENTS

| | | | |
|---|---|---|---|
| 4,176,063 A | | 11/1979 | Tyler |
| 5,152,321 A | * | 10/1992 | Drager ................ F16K 11/0856 |
| | | | 137/625.29 |
| 8,505,741 B2 | | 8/2013 | Scholz |
| 2014/0183220 A1 | | 7/2014 | Butera |
| 2016/0353920 A1 | * | 12/2016 | Mazzoni .............. B01D 15/362 |
| 2019/0049024 A1 | * | 2/2019 | Marks ................... F16K 11/076 |

FOREIGN PATENT DOCUMENTS

| | | | | |
|---|---|---|---|---|
| CN | 201801435 | | 4/2011 | |
| CN | 202152292 | | 2/2012 | |
| CN | 105276693 | | 1/2016 | |
| GB | 2156489 | | 10/1985 | |
| JP | 2005-061007 | | 3/2005 | |
| JP | 2006-329334 | | 12/2006 | |
| KR | 10-2003-0023997 | | 3/2003 | |
| WO | WO 2015-038719 | | 3/2015 | |
| WO | WO-2017139080 A1 | * | 8/2017 | ......... B01D 35/1573 |

* cited by examiner

BYPASS VALVE AND WATER PURIFIER

CROSS REFERENCE TO RELATED APPLICATIONS

This application is a national stage filing under 35 U.S.C. 371 of PCT/IB2019/058924, filed 18 Oct. 2019, which claims the benefit of Chinese Patent Application No. 201811259219.8, filed 26 Oct. 2018, the disclosures of which are incorporated by reference in their entirety herein.

TECHNICAL FIELD

The present invention relates to the field of water purification technologies and specifically to a bypass valve and a water purifier.

BACKGROUND

In some water purifiers, water can be softened through an ion-exchange resin to reduce water hardness. However, with consideration to the perspective of scale mitigation, it is not necessary for the ion-exchange resin to soften all of the water. Instead, only part of the water should be treated, so as to increase the service life of the ion-exchange resin and allow water to have a certain hardness.

To this end, an existing water purifier may be provided with a bypass to allow part of the water to pass therethrough without being softened, and then be mixed with water treated by an ion-exchange resin so that the final output water has an appropriate hardness.

It is obvious the original hardness of water varies under different conditions (such as geological differences); thus, if bypass water is mixed according to a fixed ratio preset when the water purifier was delivered from the factory, obtaining water of a desired hardness would not always be possible. It is therefore necessary to design the structure of a water purifier to allow on-site adjustments to the mixing ratio between bypass water and softened water in the water purifier according to needs, so that output water of the water purifier has a desired hardness and so that the water purifier has the flexibility to meet requirements of different scenarios.

SUMMARY

As one aspect of the present invention, an embodiment of the present invention provides a bypass valve, comprising a valve core and a valve housing, wherein the valve core is provided with a first inlet, a first outlet, a first channel, and a first annular seal, the first inlet and the first outlet are disposed at intervals in an axial direction, the first annular seal is fitted on an outer side surface of the valve core between the first inlet and the first outlet, and the first channel is disposed within the valve core and communicates with the first inlet and the first outlet;

the valve housing is provided with a first opening, a second opening, an inner space, and a bypass opening, the first opening and the second opening are disposed at intervals in the axial direction, the inner space communicates with the first opening and the second opening, and the bypass opening is provided on a side wall of the valve housing between the first opening and the second opening and communicates with the inner space and an outer space outside the valve housing;

the valve core is disposed in the inner space of the valve housing and is capable of rotating in the inner space around the axial direction; and the bypass opening and the first circular seal are further configured in such a manner that, when the valve core rotates, the first annular seal is capable of partitioning the bypass opening into two parts, and an axial position of a part of the first annular seal in contact with the bypass opening varies with the rotation of the valve core.

In the bypass valve according to the embodiment of the present invention, the valve core can rotate in the valve housing and change the area of a bypass channel (namely, the part of the bypass opening which is connected to the second channel), that is, change the amount of the fluid that can flow into the second channel from the bypass channel so as to change the ratio between the fluid from the main pass and the fluid from the bypass in the fluid flowing out of the bypass valve, thereby achieving the function of bypass adjustment.

As another aspect of the present invention, an embodiment of the present invention provides a water purifier, comprising a water inlet, a water outlet, a water purification medium, and the bypass valve described above, wherein the water purifier is configured in such a manner that in an operating state, at least a part of a water stream flowing in through the water inlet is introduced into the water purification medium for purification to obtain a first water stream, and the first water stream is introduced into the first channel through the first inlet of the bypass valve and then flows into the second channel through the first outlet; a second water stream is introduced into the second channel through the bypass opening; mixed water obtained after the second water stream and the first water stream flowing into the second channel are mixed flows out of the bypass valve, and then the mixed water flows out of the water purifier through the water outlet.

In the water purifier according to the embodiment of the present invention, a specially designed bypass valve is added so that output water of the water purifier can be obtained by mixing two channels of water with different qualities, and the valve core of the bypass valve can be rotated to change the bypass water amount of the bypass valve, so as to adjust the two water streams in the output water of the water purifier, namely the mixing ratio between purified water and unpurified or partially purified water; in this way, the water purifier can be adjusted on-site according to the quality of the source water so that the water purifier has the flexibility to meet requirements of different scenarios.

Figure 1:
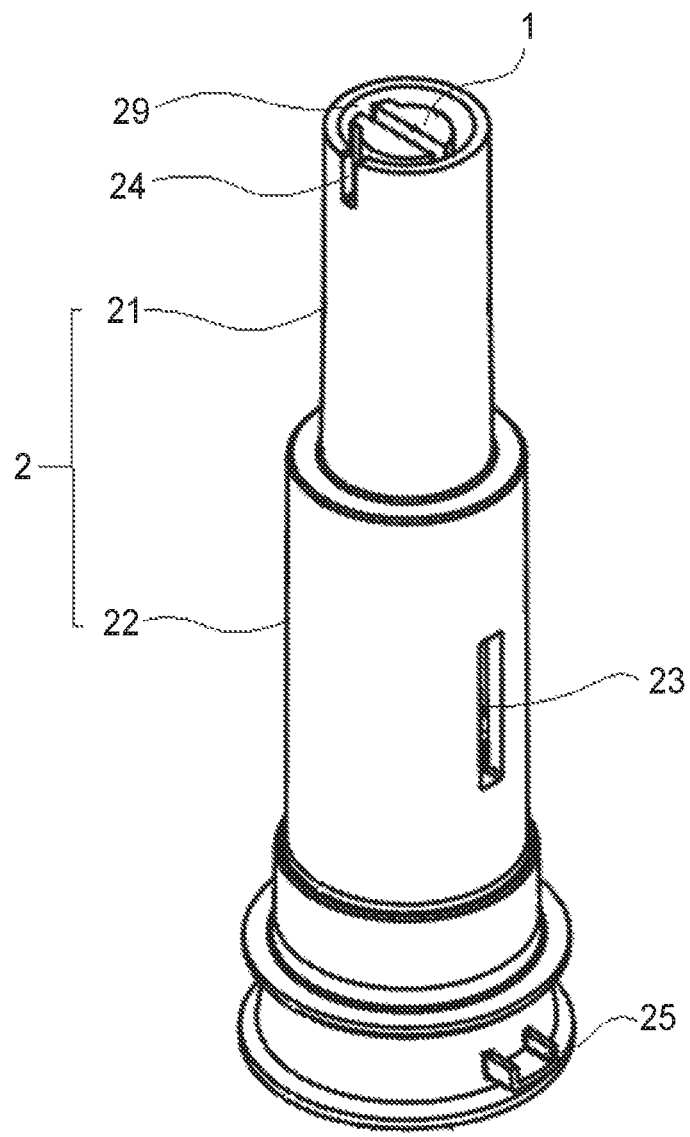
FIG. 1 is a schematic perspective structural view of a bypass valve according to an embodiment of the present invention.

1. valve core; 11. first part; 12. second part; 131. first seal ring groove; 132. second seal ring groove; 141. first outlet; 142. first inlet; 151. first surface; 152. second surface; 17. operating structure; 18. first alignment mark; 19. rib;
2. valve housing; 21. third part; 22. fourth part; 23. bypass opening; 231. bypass channel; 24. first clipping structure; 25. positioning structure; 28. first opening; 29. second opening;
31. first annular seal; 32. second annular seal; 33. third annular seal;
4. shell; 41. head; 411. water inlet; 412. water outlet; 42. main body; 423. mark disc; 4231. second alignment mark; 424. fourth opening; 425. fifth opening;
51. valve seat; 513. third opening; 514. through hole; 52. tubular member;
7. elastic member;
91. first channel; 92. second channel; 921. first segment of the first channel; 922. second segment of the first channel; and
a. included angle.

DETAILED DESCRIPTION

In order to allow those skilled in the art to better comprehend the technical solutions of embodiments of the present invention, the embodiments of the present invention are further described in detail below with reference to the accompanying drawings and specific implementations.

Interpretation of Terms

In the present application, if not specifically indicated, the meanings of the technical terms are as follows:

Axial direction, radial direction, and circumferential direction: the axial direction refers to the direction of the central axis of a structure as a whole having a shape that has a central axis (for example, a structure as a whole being a cylinder or a hollow cylinder); the radial direction refers to a direction perpendicular to the axial direction; and the circumferential direction refers to a direction rotating around the axial direction.

End surface and side surface: the side surface refers to a surface of a structure extending in a direction parallel to the axial direction, and the end surface refers to a surface of a structure extending in a direction intersecting the axial direction. For example, for a structure as a whole being a cylinder, two circular surfaces of the structure are two end surfaces, while a cylindrical surface connected between the two circular surfaces is a side surface (outer side surface). Moreover, for a structure as a whole being a hollow cylinder, a larger cylindrical surface on the outer side of the structure is an outer side surface, while a surface (a smaller cylindrical surface) of an inner space is an inner side surface.

"A as a whole is B" or "A is substantially B" refers to A being consistent with a feature B when viewed from a large metric, but does not mean that the details of A must be completely consistent with the feature B. For example, A as a whole being a cylinder means that the macroscopic shape of A is a cylinder, but A may have relatively small structural details such as a recess and a protrusion when compared with the cylinder as a whole.

Bypass Valve

An embodiment of the present invention provides a bypass valve.

As shown in FIG. 1, the bypass valve according to the embodiment of the present invention as a whole is a cylinder including a valve core 1 and a valve housing 2. The valve housing 2 is fitted over the valve core 1 and has a bypass opening 23 on a side wall. The valve core 1 is configured to be rotatable within the valve housing 2 so as to change the amount of liquid that can enter the bypass valve through the bypass opening 23 to achieve control over the bypass flow entering the bypass valve.

Optionally, the valve core 1 and the valve housing 2 are coaxially disposed; that is, they have the same axial direction. Description is provided below by using the longitudinal direction (vertical direction) being the axial direction as an example according to the figures. Accordingly, the following description will mention that a certain structure has an upper end and a lower end. However, it should be understood that the upper end and the lower end represent two axially opposed ends of the structure by only using the drawings as an example and do not mean that an end of a physical structure must be up or down in the direction of gravity.

The structure of the valve core 1 is introduced in detail below.

Figure 2:
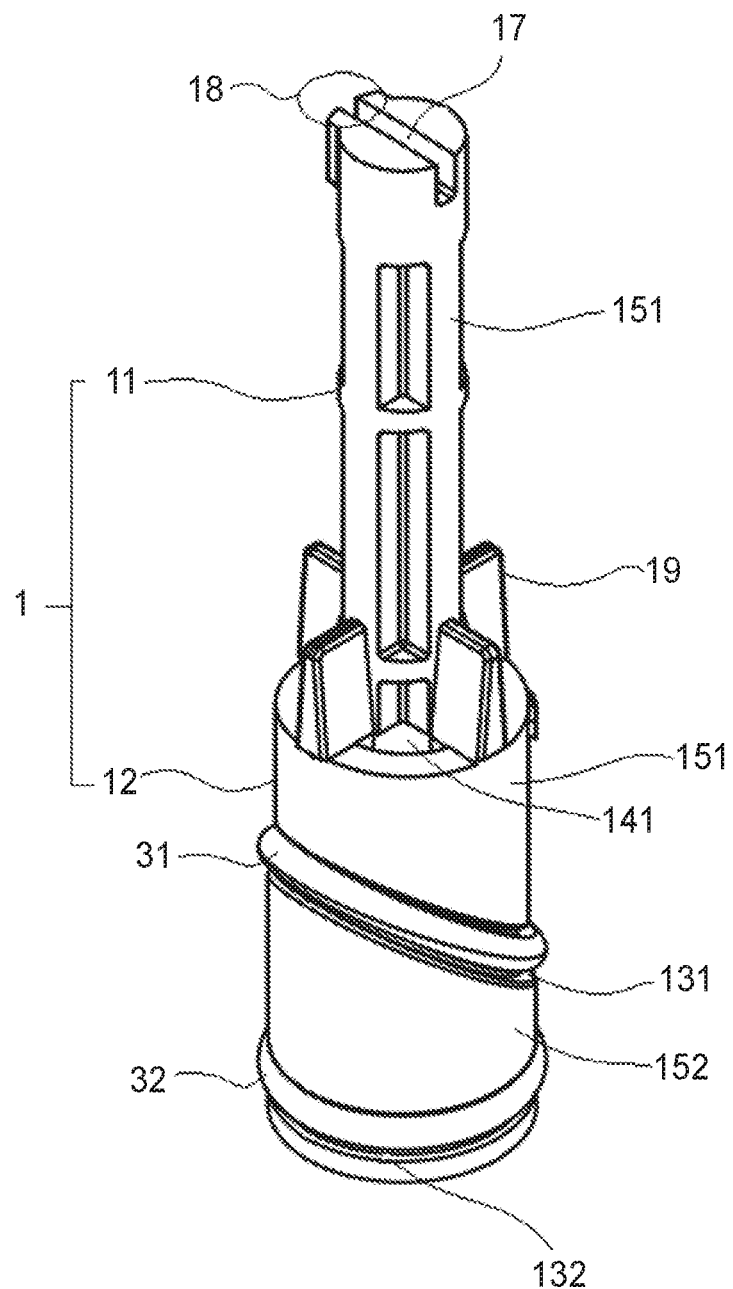
FIG. 2 is a schematic perspective structural view of a valve core of a bypass valve according to an embodiment of the present invention.

As shown in FIG. 2, according to the embodiment of the present invention, the valve core 1 of the bypass valve as a whole is a cylinder, and an outer side surface of the valve core 1 is provided with a first annular seal 31. The first annular seal 31 is fitted on the valve core 1 and is disposed in an inclined manner with respect to the axial direction of the valve core 1. The first annular seal 31 is fixed relative to and in hermetic contact with the outer side surface of the valve core 1. The first annular seal 31 can move with the movement of the valve core 1. After the valve housing 2 is fitted on the valve core 1, the first annular seal 31 is in hermetic and movable contact with an inner side surface of the valve housing 2. That is, the first annular seal 31 can move relative to the valve housing 2.

The first annular seal 31 is ring shaped and divides the outer side surface of the valve core 1 into two parts, where the outer side surface of the valve core 1 closer to the upper end than the first annular seal 31 is a first surface 151, and the outer side surface of the valve core 1 closer to the lower end than the first annular seal 31 is a second surface 152.

Figure 3:
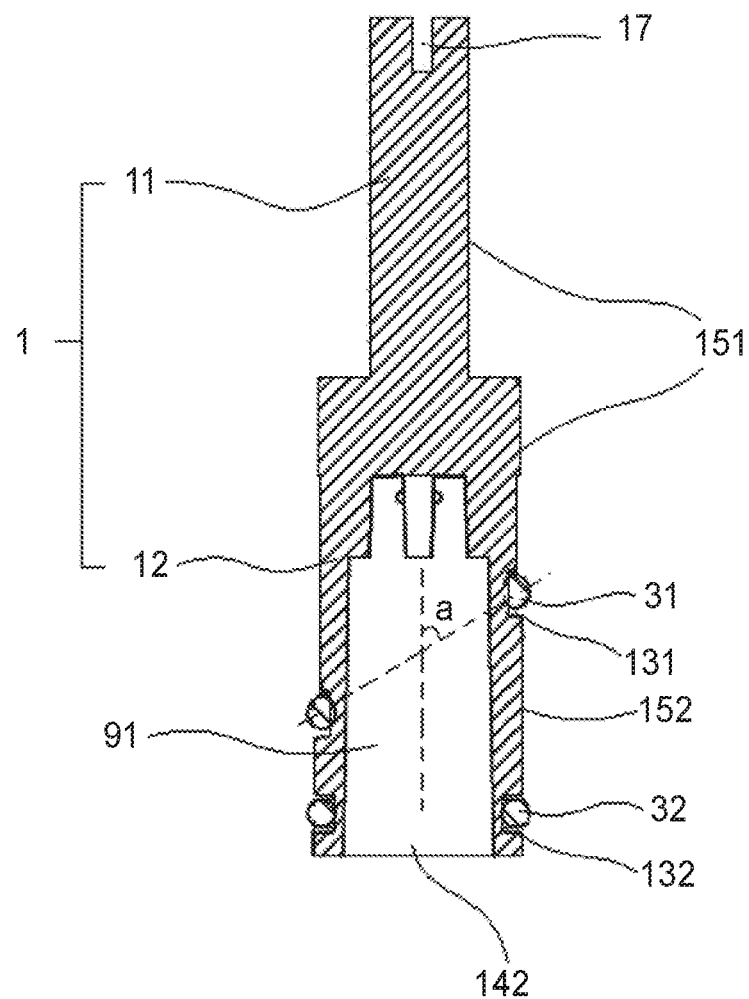
FIG. 3 is a schematic sectional structural view illustrating a longitudinal section, along an axis, of a valve core of a bypass valve according to an embodiment of the present invention.

The first annular seal 31 is disposed in an inclined manner with respect to the axial direction of the valve core 1. Exemplarily, as shown in FIG. 3, the first annular seal 31 is located in a splitting plane that is disposed in an inclined manner with respect to the axial direction. That is, an included angle a between the splitting plane (represented by an inclined dashed line in the figure) and the axial direction (represented by a longitudinal dashed line in the figure) is greater than 0 degrees and less than 90 degrees.

As shown in FIG. 2 and FIG. 3, as a manner of the embodiment of the present invention, the first annular seal 31 may be a seal ring made of an elastic material, for example, an O-shaped seal ring. As a manner of the embodiment of the present invention, the outer side surface of the valve core 1 has a first seal ring groove 131 at a position where the first annular seal 31 is disposed. The first annular seal 31 is disposed in the first seal ring groove 131 with part of the cross section protruding from the first seal ring groove 131 to achieve hermetic contact with the inner side surface of the valve housing 2.

As shown in FIG. 2, the second surface 152 of the valve core 1 further has a second annular seal 32 fitted thereon, and the second annular seal 32 is in hermetic contact with the second surface 152. After the valve housing 2 is fitted on the valve core 1, the second annular seal 32 is in hermetic and movable contact with the inner side surface of the valve housing 2. Meanwhile, the second annular seal 32 is closer to the lower end than the first annular seal 31. Further, the second annular seal 32 is closer to the lower end than the bypass opening 23 (further illustrated later) of the valve housing 2.

Certainly, the second annular seal 32 may also be a seal ring made of an elastic material (for example, an O-shaped seal ring). Moreover, the outer side surface of the valve core 1 may also be provided with a second seal ring groove 132 at a position where the second annular seal 32 is disposed. The second annular seal 32 is arranged in the second seal ring groove 132 with part of the cross section protruding from the second seal ring groove 132 to establish hermetic contact with the inner side surface of the valve housing 2.

The second annular seal 32 need not be inclined with respect to the axial direction.

The first annular seal 31 and the second annular seal 32 are not limited to the aforementioned forms of seal rings, as long as they can achieve a sealing function. For example, the first annular seal 31 and the second annular seal 32 may be annular protrusions provided on the outer side surface of the valve core 1 and having elastic and sealing properties.

As shown in FIGS. 2 and 3, the valve core 1 in the embodiment of the present invention has a first outlet 141 and a first inlet 142; a first channel 91 is disposed within the valve core 1; the first channel 91 communicates with and is between the first outlet 141 and the first inlet 142. Moreover, the first outlet 141 and the first inlet 142 are disposed at intervals in the axial direction. The first annular seal 31 is fitted on the outer side surface of the valve core 1 between the first inlet 142 and the first outlet 141. Moreover, the second annular seal 32 is closer to the lower end than the first annular seal 31, but is higher than the first inlet 142. That is, the second annular seal 32 is arranged between the first inlet 142 and the first annular seal 31. The first outlet 141 is arranged in a part of the valve core 1 closer to the upper end than the first annular seal 31 and may be a side surface or an end surface. The first inlet 142 is arranged in a part of the valve core 1 closer to the lower end than the second annular seal 32, for example, arranged on a lower end surface of the valve core 1.

As shown in FIG. 2 and FIG. 3, as a manner of the embodiment of the present invention, an upper end surface (namely, an end surface away from the first inlet 142) of the valve core 1 is provided with an operating structure 17 that can drive the valve core 1 to rotate under an external force. Specifically, the operating structure 17 may be an operating recess, so that only a head of a tool such as a screwdriver needs to be inserted into the operating recess and then the screwdriver is turned to drive the valve core 1 to rotate.

As shown in FIG. 2, as a manner of the embodiment of the present invention, the upper end surface of the valve core 1 is provided with a first alignment mark 18. For example, the first alignment mark 18 may be a radially protruding part. The relative position of the valve core 1 with respect to the valve housing 2 can be determined by aligning the first alignment mark 18 with other structures (for example, a mark disc 423 described below). Optionally, the first alignment mark 18 may also be the same structure as the operating structure 17. That is, the operating structure 17 also has the function of the first alignment mark 18.

As shown in FIG. 2 and FIG. 3, as a manner of the embodiment of the present invention, the valve core 1 is divided, in the axial direction, into a first part 11 close to the upper end and a second part 12 close to the lower end, and a radial dimension of the first part 11 is smaller than a radial dimension of the second part 12. That is, the valve core 1 as a whole is formed by a "thin" cylinder and a "thick" cylinder that are connected to each other. A lower end of the first part 11 is connected to an end surface of an upper end of the second part 12, and a part on the upper end surface of the second part 12 not corresponding to the first part 11 is provided with the aforementioned first outlet 141. Accordingly, the aforementioned first annular seal 31 and second annular seal 32 are disposed on an outer side surface of the second part 12, and the first channel 91 is also arranged in an inner space of the second part 12.

Certainly, the above description "the first part 11 is connected to the second part 12" does not mean that the first part 11 and the second part 12 are definitely assembled by two components. The entire valve core 1 may be an integral structure formed by injection molding or the like. For example, as shown in FIG. 2, the first part 11 as a whole is a solid cylinder; the second part 12 as a whole is a hollow cylinder; the first part 11 is connected to the second part 12 by means of a plurality of ribs 19 disposed on the upper end surface of the second part 12; and the first outlet 141 is formed between each of the ribs 19.

The structure of the valve housing 2 is introduced in detail below.

Figure 4:
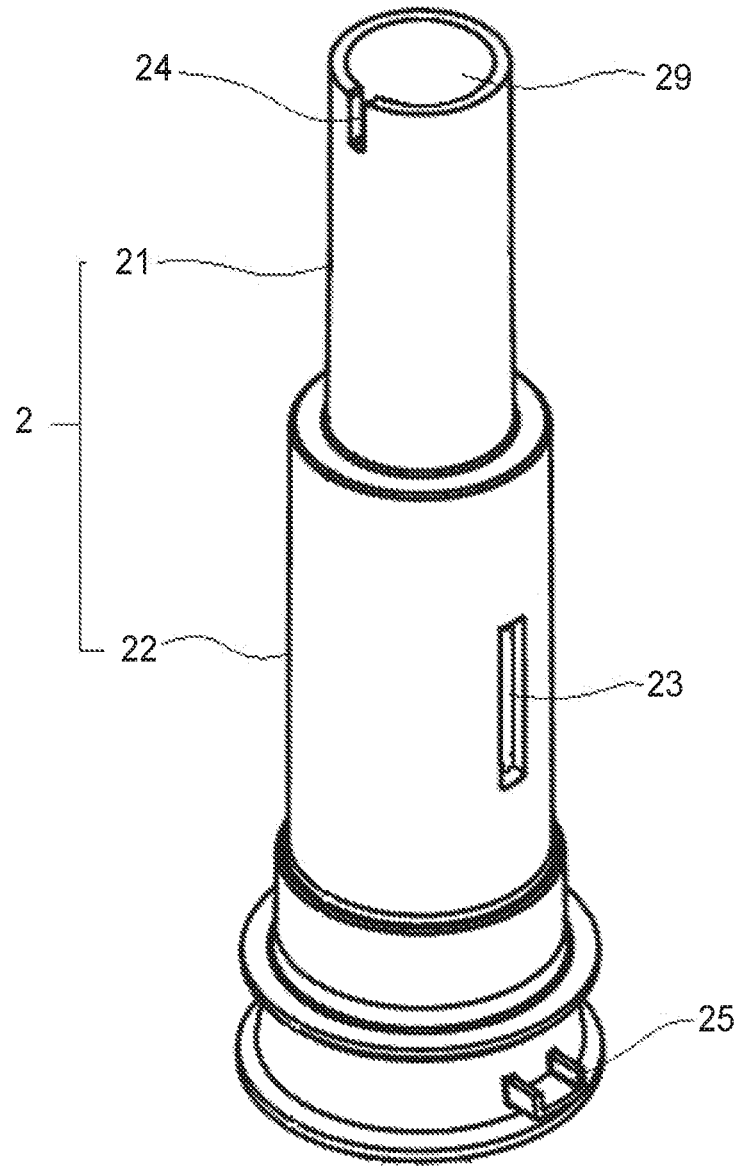
FIG. 4 is a schematic perspective structural view of a valve housing of a bypass valve according to an embodiment of the present invention.
Figure 5:
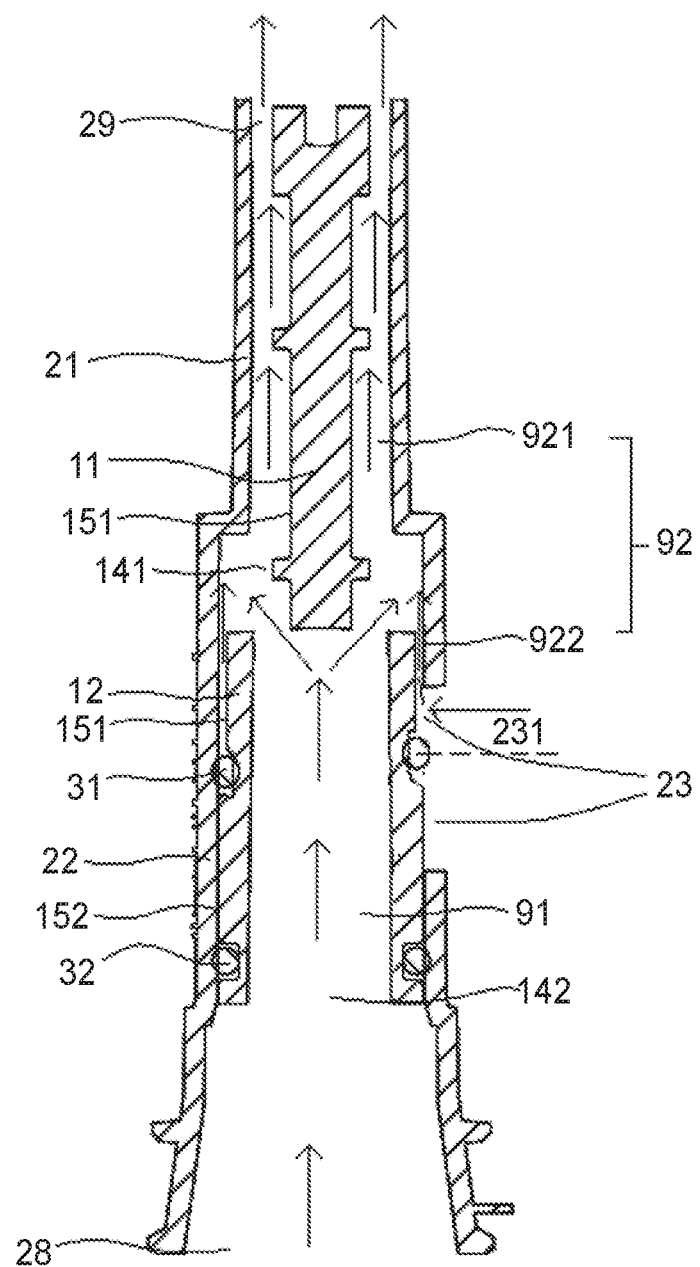
FIG. 5 is a schematic sectional structural view illustrating a longitudinal section, along an axis, of a bypass valve according to an embodiment of the present invention.

As shown in FIG. 4 and FIG. 5, according to an embodiment of the present invention, the valve housing 2 of the bypass valve as a whole is a cylinder (which may certainly be of other shapes) and has a first opening 28 and a second opening 29 disposed at intervals in the axial direction.

Exemplarily, in the embodiment shown in FIG. 5, the first opening 28 is arranged on a lower end surface of the valve housing 2; the second opening 29 is arranged on an upper end surface of the valve housing 2. The valve housing 2 further includes an inner space that communicates with the first opening 28 and the second opening 29 and can accommodate the valve core 1.

The valve housing 2 is provided with a bypass opening 23 on a side wall between the first opening 28 and the second opening 29. The bypass opening 23 communicates with the inner space of the valve housing 2 and an outer space outside the valve housing 2.

As shown in FIG. 4, as a manner of the embodiment of the present invention, an axial dimension of the bypass opening 23 is larger than a circumferential dimension of the bypass opening 23. That is, the bypass opening 23 has a larger axial dimension and is an "elongated" opening disposed in the axial direction.

In different embodiments, the side wall of the valve housing 2 may be provided with a plurality of bypass openings 23, such as two or three. The bypass opening 23 may also be of other shapes, for example, a square opening or a circular opening.

As shown in FIG. 4 and FIG. 5, as a manner of the embodiment of the present invention, corresponding to the valve core 1, the valve housing 2 is divided, in the axial direction, into a third part 21 corresponding to the first part 11 of the valve core 1 and a fourth part 22 corresponding to the second part 12 of the valve core 1. The third part 21 is fitted over the first part 11, and the fourth part 22 is fitted over the second part 12. The third part 21 and the fourth part 22 of the valve housing 2 as a whole are both hollow cylinders, and a radial dimension of an inner space of the third part 21 is smaller than a radial dimension of an inner space of the fourth part 22, that is, "thinner" Accordingly, the aforementioned bypass opening 23 is provided on a side wall of the fourth part 22.

Certainly, it should be understood that the inner space structure of the valve housing 2 should conform to the shape and dimension of the valve core 1 so that the valve housing 2 can accommodate the valve core 1. For example, if the valve core 1 has the same radial dimension for each part and is not divided into the first part and the second part, then the valve housing 2 should also have the same radial dimension for each part in the inner space and not be divided into the third part and the fourth part.

As a manner of the embodiment of the present invention, the second opening 29 of the valve housing 2 is arranged on the upper end surface of the valve housing 2, so that the second opening 29 can expose the upper end surface of the valve core 1 as shown in FIG. 1 to expose the aforementioned operating structure 17 and first alignment mark 18 so as to facilitate operation and observation thereon.

Figure 8:
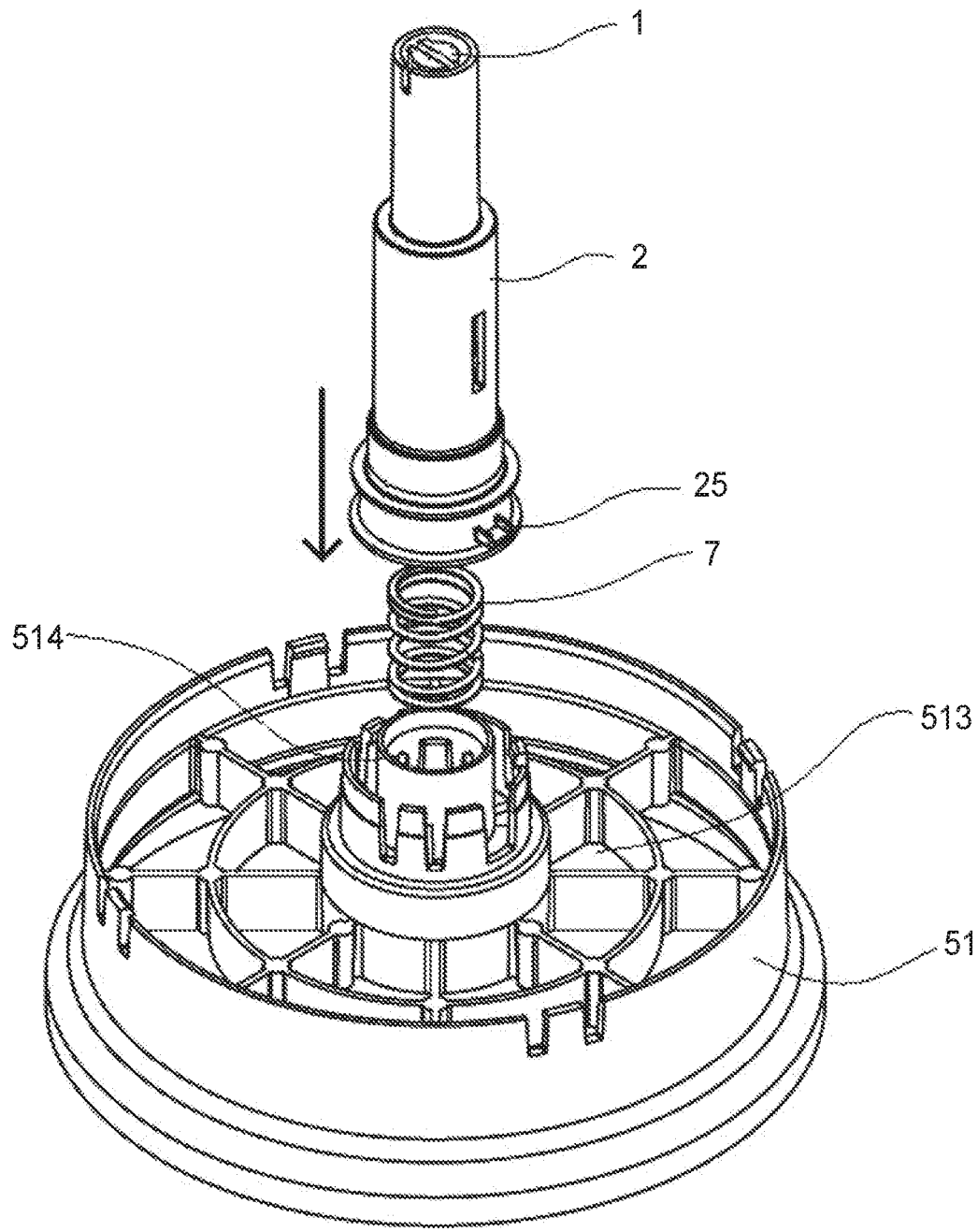
FIG. 8 is a schematic exploded structural view illustrating an installation structure of a bypass valve in a water purifier according to an embodiment of the present invention.
Figure 9:
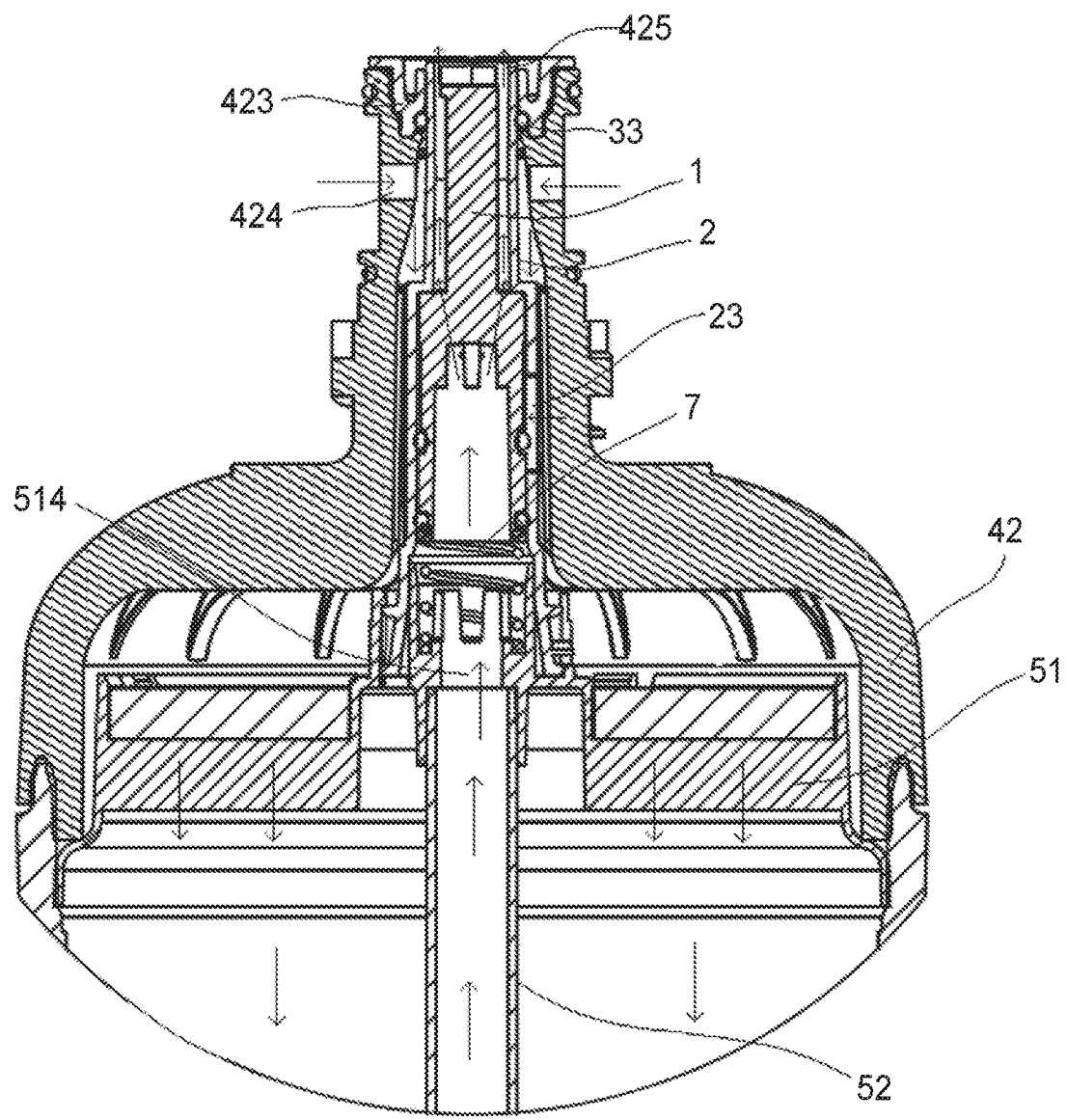
FIG. 9 is a schematic partial sectional structural view illustrating a longitudinal section, along an axis, of a water purifier according to an embodiment of the present invention.

As shown in FIG. 4, as a manner of the embodiment of the present invention, a side wall of the second opening 29 on the upper end of the valve housing 2 is further provided with a first clipping structure 24 for engagement with a second clipping structure on the mark disc 423 (as shown in FIG. 9) to prevent the mark disc 423 from rotating relative to the upper end of the valve housing 2. The side wall of the valve housing 2 is further provided with a protruding positioning structure 25 for engagement with a valve seat 51 (as shown in FIG. 8) to prevent relative rotation.

The structure of the bypass valve obtained by combining the valve housing 2 and the valve core 1 is introduced in detail below.

In the bypass valve according to the embodiment of the present invention as shown in FIG. 1, the valve core 1 is disposed in the inner space of the valve housing 2 and can rotate in the inner space around the axial direction.

As shown in FIG. 5, a gap is formed between the inner side surface of the valve housing 2 and the outer side surface of the valve core 1, and the first annular seal 31 partitions the gap into two parts. As shown in FIG. 5, the gap between the first surface 151 of the valve core 1 and the corresponding inner side surface of the valve housing 2 is a second channel 92. In the second channel 92, a first segment 921 of the second channel is between the first part 11 of the valve core 1 and the third part 21 of the valve housing 2, and a second segment 922 of the second channel is between the second part 12 of the valve core 1 and the fourth part 22 of the valve housing 2.

The second annular seal 32 also partitions the gap between the inner side surface of the valve housing 2 and the outer side surface of the valve core 1 into two parts not in communication with each other. Moreover, the second annular seal 32 is lower than the bypass opening 23 so that the second annular seal 32 is arranged between the first inlet 142 and the bypass opening 23 in the axial direction.

As shown in FIG. 5, the bypass opening 23 and the first annular seal 31 are configured in such a manner that after the valve housing 2 and the valve core 1 are assembled, the first annular seal 31 can partition the bypass opening 23 into two parts. A part of the bypass opening 23 opposite to the first surface 151 (a part arranged above the first annular seal 31) is a bypass channel 231. That is, the bypass channel 231 is a part of the bypass opening 23 that can communicate with the aforementioned second channel 92, specifically, the second segment 922 of the second channel Conversely, for a part other than the bypass channel 231 in the bypass opening 23 (a part arranged below the first annular seal 31), namely, a part of the bypass opening 23 corresponding to the second surface 152, because of the existence of the first annular seal 31 and the second annular seal 32, the liquid entering this part cannot enter the second channel 92 and cannot enter the first channel 91, so that this part does not serve as an actual bypass channel.

As shown in FIG. 5, as previously described, the first annular seal 31 is disposed in an inclined manner with respect to the axial direction of the valve core. Thus, when the valve core 1 rotates, the first annular seal 31 rotates along with the valve core 1, and then the axial position of a portion of the first annular seal 31 opposite to, i.e., in contact with, the bypass opening 23 varies. Certainly, in different embodiments, the bypass opening 23 and the first annular seal 31 may further have other structural designs so that when the valve core 1 rotates, the axial position of the part of the first annular seal 31 opposite to the bypass opening 23 varies. In the bypass valve, the valve core 1 is configured to be rotatable in the valve housing 2 around the axial direction so as to orient different parts of the side surface of the valve core 1 toward the bypass opening 23. Since the first annular seal 31 is inclined with respect to the axial direction, the axial position of the first annular seal 31 at different side surfaces of the valve core 1 also varies. When the valve core 1 rotates, the first annular seal 31 at different side surfaces of the valve core 1 faces the bypass opening 23. Thus, the axial position of the part of the first annular seal 31 opposite to the bypass opening 23 varies, so as to change the area of the bypass channel 231 in the bypass opening 23 or to change the area of the part of the bypass opening 23 above the first annular seal 31.

The fluid flow direction during operation of the bypass valve is shown by the arrows in FIG. 5. A first fluid (or referred to as a main pass fluid), for example, a purified fluid, flows in through the first opening 28 of the valve housing 2 that is arranged at the lower end. Because of the existence of the second annular seal 32, the fluid can only flow into the first channel 91 within the valve core 1 through the first inlet 142 of the valve core 1 and then flow out through the first outlet 141 of the valve core 1 and enter the second channel 92. Specifically, the fluid flows into a junction between the second segment 922 of the second channel and the first segment 921 of the second channel and continues to flow into the first segment 921 of the second channel.

As shown by the arrows in FIG. 5, a second fluid (or referred to as a bypass fluid), for example, an unpurified fluid or an incompletely purified fluid, directly flows in from the outside of the valve housing 2 through the bypass channel 231 in the bypass opening 23 and enters the gap between the valve core 1 and the valve housing 2 above the first annular seal 31; namely, the second fluid enters the second segment 922 of the second channel Afterwards, this part of the fluid continues to flow upward and enters the first segment 921 of the second channel.

In this way, the first fluid from the first channel 91 and the second fluid from the second segment 922 of the second channel are mixed in the first segment 921 of the second channel. Afterwards, they jointly flow out of the bypass valve through the second opening 29 on the upper end surface of the valve housing 2. Thus, all the fluid in the first channel 91 comes from the first inlet 142; all the fluid in the second segment 922 of the second channel comes from the bypass channel 231 of the bypass opening 23; and the fluid in the first segment 921 of the second channel is a mixture of the fluid from the first inlet 142 and the fluid from the bypass channel 231.

As previously described, during rotation of the valve core 1, the area of the aforementioned bypass channel 231 can be changed; that is, the amount of the second fluid that can flow into the second channel 92 from the bypass channel 231 is changed, so as to finally change the ratio between the fluid from the main pass (the first fluid) and the fluid from the bypass (the second fluid) in the fluid flowing out of the bypass valve, thereby achieving the function of bypass adjustment.

Certainly, the aforementioned second segment 922 of the second channel is actually an annular space. Thus, as shown in FIG. 5, the fluid from the bypass channel 231 actually flows toward the upper end from everywhere at the same time in the circumferential direction of the annulus, rather than just flowing along the gap on the side where the bypass opening 23 is located.

As an implementation manner of the present invention, in the axial direction, the part of the first annular seal 31 closest to the lower end (namely, closest to the first inlet 142) may be flush with the edge of the bypass opening 23 closest to the lower end or lower than the edge of the bypass opening 23 closest to the lower end. Thus, when the part of the first annular seal 31 closest to the lower end rotates to face the bypass opening 23, namely, reaches the adjustable lowermost edge, then the entire bypass opening 23 completely corresponds to the first surface 151. That is, the whole bypass opening 23 completely forms the bypass channel 231. At this time, the bypass channel 231 has the largest area and can reach the entire area of the bypass opening 23. The bypass valve has the maximum bypass flow and can enable the largest proportion of fluid from the branch to enter; the bypass valve achieves "full opening" of the bypass channel 231.

Or, the part of the first annular seal 31 closest to the lower end (namely, closest to the first inlet 142) may also be higher than the edge of the bypass opening 23 closest to the lower end. When the part of the first annular seal 31 closest to the lower end rotates to face the bypass opening 23, namely, reaches the adjustable lowermost edge, then part of the bypass opening 23 corresponds to the first surface 151 and part of the bypass opening 23 corresponds to the second surface 152. That is, part of the bypass opening 23 forms the bypass channel 231. In this case, the area of the bypass channel 231 is not the entire area of the bypass opening 23, but is still the largest area of the bypass channel 231 in the structure in this embodiment; the bypass valve has the maximum bypass flow.

As an implementation manner of the present invention, in the axial direction, the part of the first annular seal 31 closest to the upper end (namely, closest to the first outlet 141) is flush with the edge of the bypass opening 23 closest to the upper end or is closer to the upper end than the edge of the bypass opening 23 closest to the upper end. Thus, when the part of the first annular seal 31 closest to the upper end rotates to face the bypass opening 23, namely, reaches the adjustable uppermost edge, then the bypass opening 23 completely corresponds to the second surface 152. That is, the area of the bypass channel 231 is zero; the fluid from the bypass branch cannot enter the bypass valve at all; the bypass valve achieves "full closing" of the bypass channel 231; and the bypass valve has the minimum bypass flow, namely, zero bypass of fluid. At this time, the outlet of the bypass valve substantially has no bypass of fluid.

Or, the part of the first annular seal 31 closest to the upper end (namely, closest to the first outlet 141) is configured to be lower than the edge of the bypass opening 23 closest to the upper end. Thus, when the part of the first annular seal 31 closest to the upper end rotates to face the bypass opening 23, namely, reaches the adjustable uppermost edge, part of the bypass opening 23 corresponds to the first surface 151 and part of the bypass opening 23 corresponds to the second surface 152. That is, part of the bypass opening 23 forms the smallest bypass channel 231. In this case, the bypass valve still has the second fluid flowing into the bypass branch, and the minimum bypass flow is not zero. A mixed fluid of the first fluid and the second fluid flows out of the bypass valve, and the second fluid has the smallest content.

When the first annular seal 31 separately meets the aforementioned position requirements, the bypass valve can separately achieve the maximum or minimum bypass flow of the bypass channel and achieve the maximum level of adjustment.

Certainly, in addition to the aforementioned "maximum bypass flow" state or "minimum bypass flow" state, the valve core 1 is rotated so that the part of the first annular seal 31 at the bypass opening 23 may be arranged at a certain position between the adjustable uppermost edge and the adjustable lowermost edge of the bypass opening 23, thus the area of the bypass channel 231 is a certain area between an adjustable minimum area and an adjustable maximum area, and then the amount of the fluid entering the second segment 922 of the second channel from the bypass channel 231 varies accordingly. Therefore, when the valve core 1 rotates to a state between the aforementioned "maximum bypass flow" state and "minimum bypass flow" state, the bypass valve further has a plurality of different bypass flow states.

Water Purifier

An embodiment of the present invention provides a water purifier using the aforementioned bypass valve.

The water purifier according to the embodiment of the present invention may be a Point of Entry (POE) or Point of Use (POU) water purifier directly disposed in a user's home. The water purifier may be used for purifying, such as softening or filtering water.

The water purifier according to the embodiment of the present invention may be a stand-alone water purification device or a part of a water purification device, such as a filter element.

The water purifier according to the embodiment of the present invention has a water inlet 411, a water outlet 412, and a water purification medium. The water purifier is configured in such a manner that during operation, at least a part of a water stream flowing in through the water inlet 411 is introduced into the water purification medium for purification to obtain a first water stream, and the first water stream is introduced into the first channel 91 through the first inlet 142 of the bypass valve and then flows into the second channel 92 through the first outlet 141; a second water stream is introduced into the second channel 92 through the bypass opening 23; mixed water obtained after mixing the second water stream and the first water stream flowing into the second channel 92 flows out of the bypass valve, and then the mixed water flows out of the water purifier through the water outlet 412.

In the water purifier according to the embodiment of the present invention, the valve core of the bypass valve is rotated to change the ratio between the first water stream and the second water stream in the mixed water output from the water purifier, so that the water purifier can be adjusted on-site according to the quality of the source water so that the water purifier has the flexibility to meet requirements of different scenarios.

The structure of the water purifier is introduced in detail below.

Figure 6:
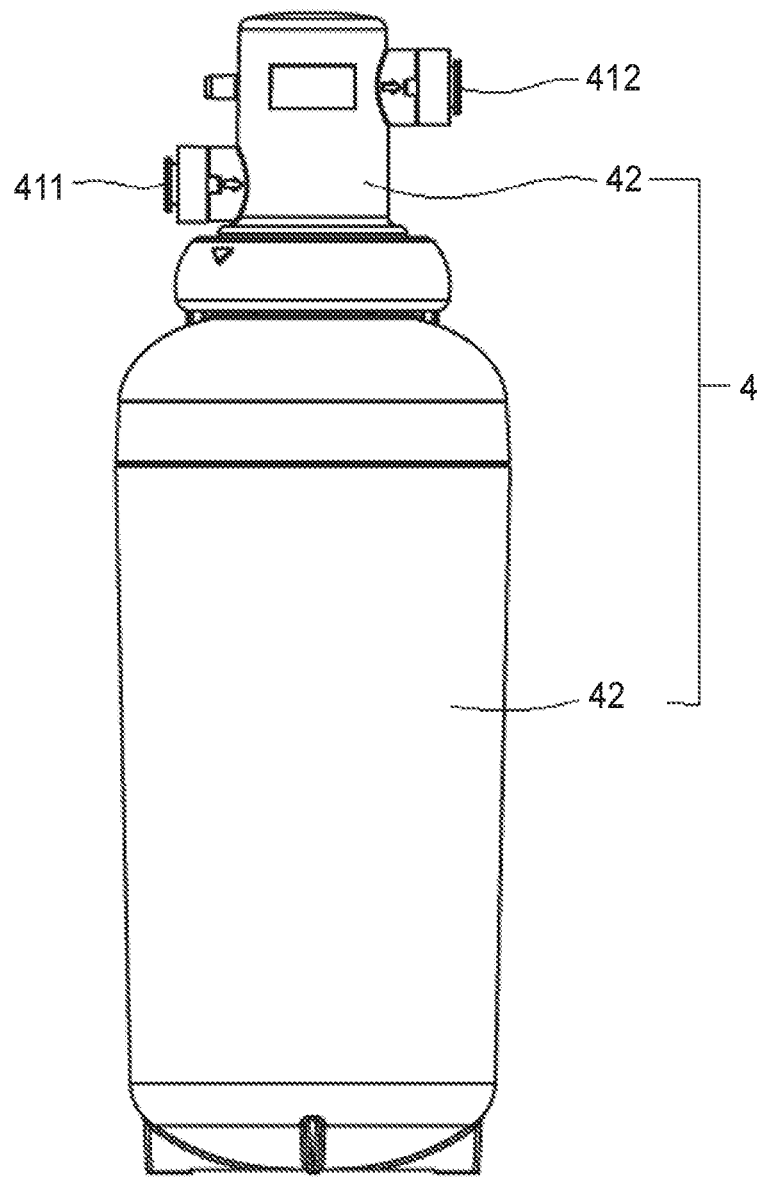
FIG. 6 is a schematic structural view of a water purifier according to an embodiment of the present invention.

As shown in FIG. 6, the water purifier according to the embodiment of the present invention has a shell 4. The bypass valve, the water purification medium, and other related components are all disposed in the shell 4, while the water inlet 411 and the water outlet 412 are provided on the shell 4.

Figure 7:
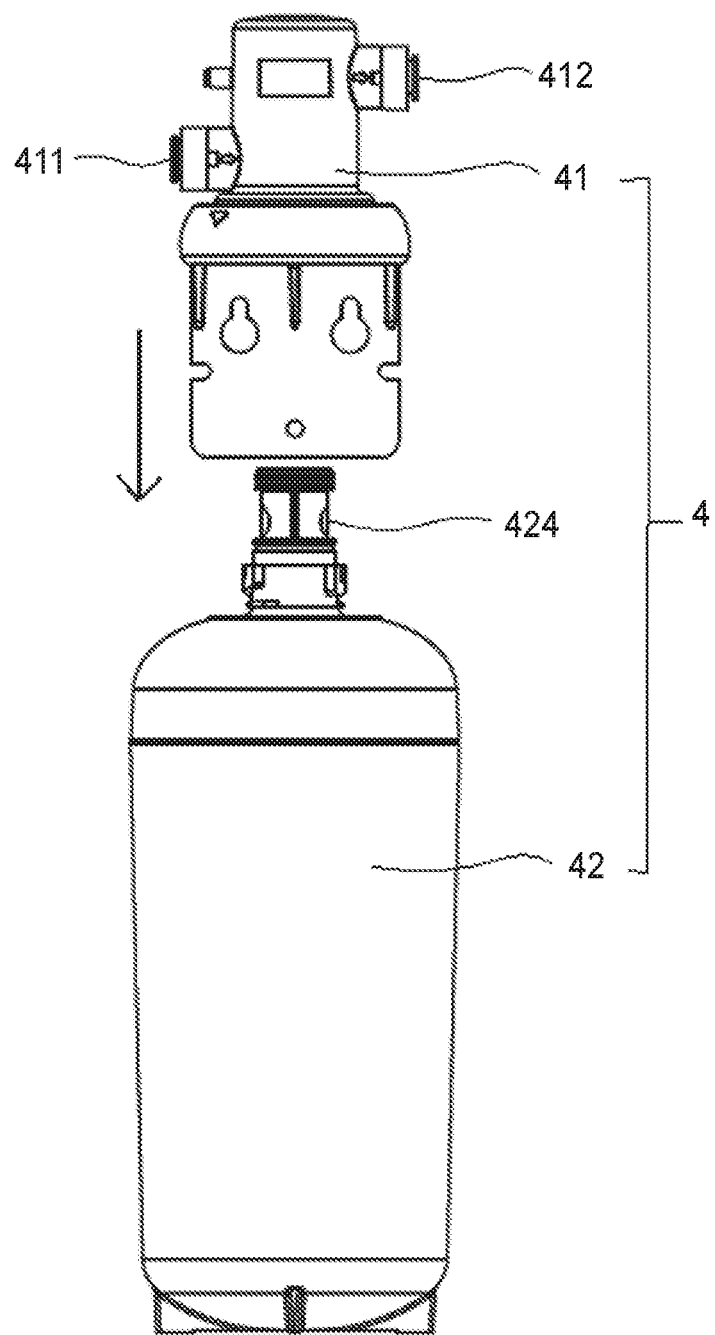
FIG. 7 is a schematic structural view of a water purifier with a head and a main body separated according to an embodiment of the present invention.

As shown in FIG. 6 and FIG. 7, as a manner of the embodiment of the present invention, the shell 4 is divided into a head 41 and a main body 42, and the head 41 and the main body 42 are detachably connected. That is, the head 41 can be repeatedly detached from or mounted to the main body 42. Specifically, the connection between the head 41 and the main body 42 may be threaded connection, snap-fit connection or other manners.

As shown in FIG. 6, FIG. 7, and FIG. 9, the water inlet 411 and the water outlet 412 are both provided on the head 41. Water entering the head 41 through the water inlet 411 can enter into the main body 42 through a fourth opening 424 on the main body 42. The bypass valve is disposed within the main body 42. Water flowing out of the bypass valve enters the head 41 and flows out through the water outlet 412.

Therefore, when the head 41 is detached from the main body 42, the operating structure 17 and the first alignment mark 18 on the upper end of the bypass valve are exposed to facilitate operation on the bypass valve; moreover, after the head 41 and the main body 42 are assembled together, the bypass valve is enclosed in the shell 4.

As shown in FIG. 8 and FIG. 9, as a manner of this embodiment, the water purifier further includes a valve seat 51, an elastic member 7, and a tubular member 52. The valve seat 51 has a through hole 514 running therethrough. The bypass valve is fixedly connected to the valve seat 51 by means of snapping or the like, so that one end of the through hole 514 communicates with the first inlet 142 of the valve core 1, and the other end communicates with an outlet (namely, an outflow port of the purified water) of purified water (namely, the first water stream) of the water purification medium. Exemplarily, the first opening 28 of the valve housing 2 is fitted on the upper end of the through hole 514, and the side wall of the valve housing 2 has a protruding positioning structure 25 for engagement with the valve seat 51 to fix them relative to each other.

One end of the tubular member 52 is the purified water outlet that communicates with the lower end of the through hole 514 of the valve seat 51. The other end of the tubular member 52 is disposed in a purification space where the water purification medium is located. Since the tubular member 52 is provided, the through hole 514 of the valve seat 51 is substantially communicates with a specific position in the purification space, so as to ensure that only purified water (namely, the first water stream) sufficiently purified by the water purification medium can flow into the tubular member 52 and flow into the bypass valve.

An upper end of the elastic member 7 makes contact with the end surface of the valve core 1 where the first inlet 142 is located, and a lower end makes contact with the valve seat 51, so as to apply an elastic force directed to the upper end to the valve core 1. Thus, the valve core 1 is elastically supported, so that the valve core 1 can flexibly rotate relative to the valve housing 2, and can be always defined at a required position relative to the valve housing 2 in the axial direction.

As a form of the embodiment of the present invention, the second water stream comes from a water stream flowing in through the water inlet 411. Exemplarily, for the water stream flowing into the water purifier through the water inlet 411, one part of the water stream is brought into contact with the water purification medium from a predetermined flow path and purified into purified water by the water purification medium to form the first water stream and then flows into the second channel 92; the other part of the water stream then directly enters the second channel 92 through the bypass opening 23 to become the second water stream.

A variety of specific structures can be implemented for the aforementioned flow path. For example, as shown in FIG. 8, the valve seat 51 is disposed within the main body 42 of the shell 4, an outer side surface of the valve seat 51 is in hermetic contact with an inner side surface of the main body 42, and the valve seat 51 further has a plurality of third openings 513. The water inlet 411 communicates with a place above the valve seat 51, and below the valve seat 51 is the purification space where the water purification medium is disposed. Thus, the water stream entering through the water inlet 411 flows into the space outside the valve housing 2 and above the valve seat 51 through the fourth opening 424. One part of the water flows down into the purification space through the third openings 513 of the valve seat 51, is purified into purified water by the water purification medium to form the first water stream, and then flows into the second channel 92 through the tubular member 52, the through hole 514, the first opening 28, the first inlet 142, and the first channel 91; the other part of the water stream from the water inlet 411 directly flows into the second channel 92 through the bypass opening 23 to become the second water stream that is unpurified or incompletely purified; mixed water of the first water stream and the second water stream then flows into the head 41 through the second opening 29 of the valve housing 2 and flows out through the water outlet 412.

In order to prevent water flowing into the main body 42 through the fourth opening 424 from directly flowing out through a fifth opening 425, a third annular seal 33 is further disposed at a position higher than the fourth opening 424 and between the valve housing 2 and the main body 42.

Certainly, the aforementioned structures such as the shell 4, the valve seat 51, and the tubular member 52 are merely one example of possible forms of the water purifier. The water purifier may also be of other specific structures, as long as the bypass valve according to the embodiment of the present invention is used in the water purifier, and the proportion of water from the bypass opening in water output from the water purifier can be adjusted by means of the bypass valve.

As a manner of this embodiment, the water purification medium includes ion-exchange resin particles that can soften water, and thus the water purifier has a function of softening water. In a preferred embodiment, the water stream flowing in through the water inlet 411 is a filtered water stream. For example, treatments by active carbon granules, a microfiltration membrane, an ultrafiltration membrane, a reverse osmosis membrane or the like, to filter out particulate matters, suspended solids, bacteria or the like in the water stream.

As another form of the embodiment of the present invention, the water purification medium includes a first purification medium and a second purification medium; the water stream flowing in through the water inlet 411 may be an unfiltered water stream such as tap water. The first water stream is a (completely) purified water stream that is purified by the first purification medium and the second purification medium. The second water stream comes from an incompletely purified water stream that is purified by the first purification medium but not purified by the second purification medium. Exemplarily, the second purification medium is a purification medium including ion-exchange resin particles that can soften water streams and obtain soft water. The first purification medium may be a purification medium including active carbon granules, or a microfiltration membrane, an ultrafiltration membrane, a reverse osmosis membrane or the like, to perform filtration treatment for particulate matters, suspended solids, bacteria or the like in water streams. In this way, the output water of the water purifier contains water filtered by the first purification medium and softened by the second purification medium; water filtered by the first purification medium but not softened by the second purification medium; and water of different hardness obtained by adjusting the bypass valve and changing the content of the two water streams.

A variety of structures can be implemented for the aforementioned function. For example, a filter layer may be directly disposed downstream of the water inlet 411 so that all water entering the water purifier is filtered.

As a form of the embodiment of the present invention, as shown in FIG. 9 to FIG. 15, the water purifier further includes an alignment mark structure. The alignment mark structure may be a mark disc 423 that is unrotatably fitted on the upper end of the valve housing 2 (namely, the end away from the first inlet 142) and is provided with at least two second alignment marks 4231. Two of the second alignment marks respectively represent that the bypass valve has a maximum bypass water stream and a minimum bypass water stream.

As shown in FIG. 8, FIG. 10, FIG. 12, and FIG. 14, as a manner of this embodiment, the mark disc 423 is fixed to the upper end of the main body 42, and the mark disc 423 is provided with a second clipping structure capable of engagement with the first clipping structure 24 on the upper end of the valve housing 2. Exemplarily, the first clipping structure 24 may be a notch, while the second clipping structure is a protrusion that can be snapped into the notch so that by means of engagement therebetween, the valve housing 2 can be fixed to a predetermined position relative to the mark disc 423.

As shown in FIG. 8, FIG. 10, FIG. 12, and FIG. 14, as a manner of this embodiment, when the head 41 is separated from the main body 42, the mark disc 423 is exposed, and the upper end of the valve housing 2 and the upper end of the valve core 1 are also exposed. That is, the first alignment mark 18 of the valve core 1 is exposed. Thus, by aligning the first alignment mark 18 with different second alignment marks 4231, the relative position of the valve core 1 in the valve housing 2 can be determined. That is, the opening degree of the bypass channel 231 in the bypass valve can be determined.

For example, as shown in FIG. 8, FIG. 10, FIG. 12, and FIG. 14, three second alignment marks 4231 may exist and are respectively a "one-stroke" mark, a "two-stroke" mark, and a "three-stroke" mark and respectively represent three different predetermined opening degrees of the bypass channel 231.

Figure 10:
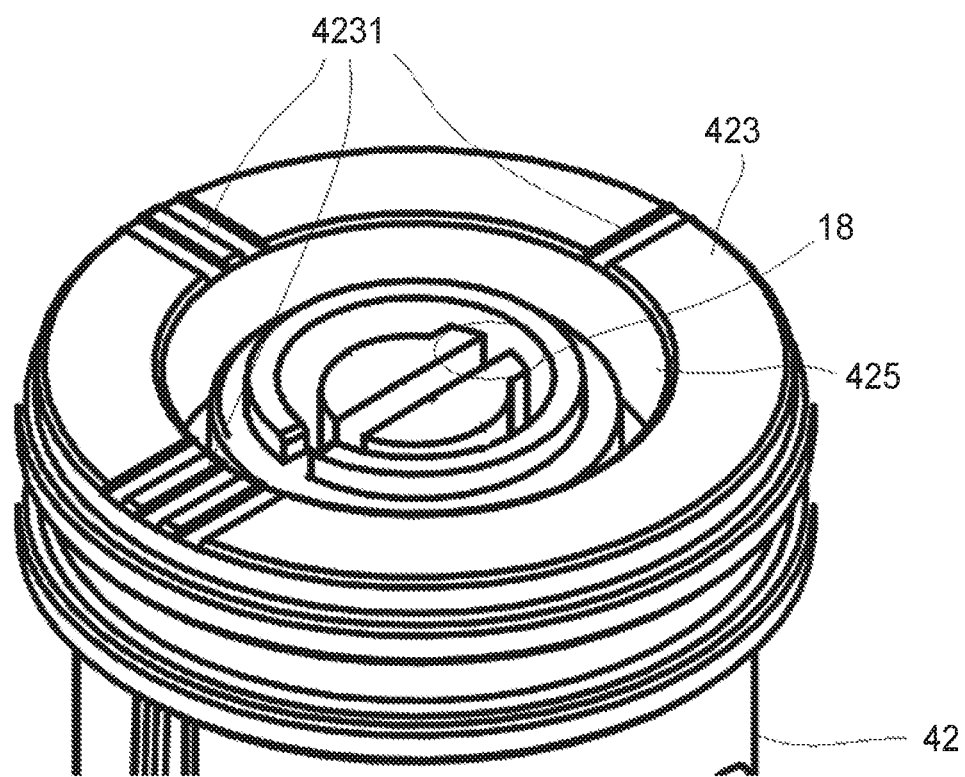
FIG. 10 is a schematic view illustrating a positional relationship between a mark disc and a first alignment mark when a valve core in a water purifier rotates to a state according to an embodiment of the present invention.
Figure 11:
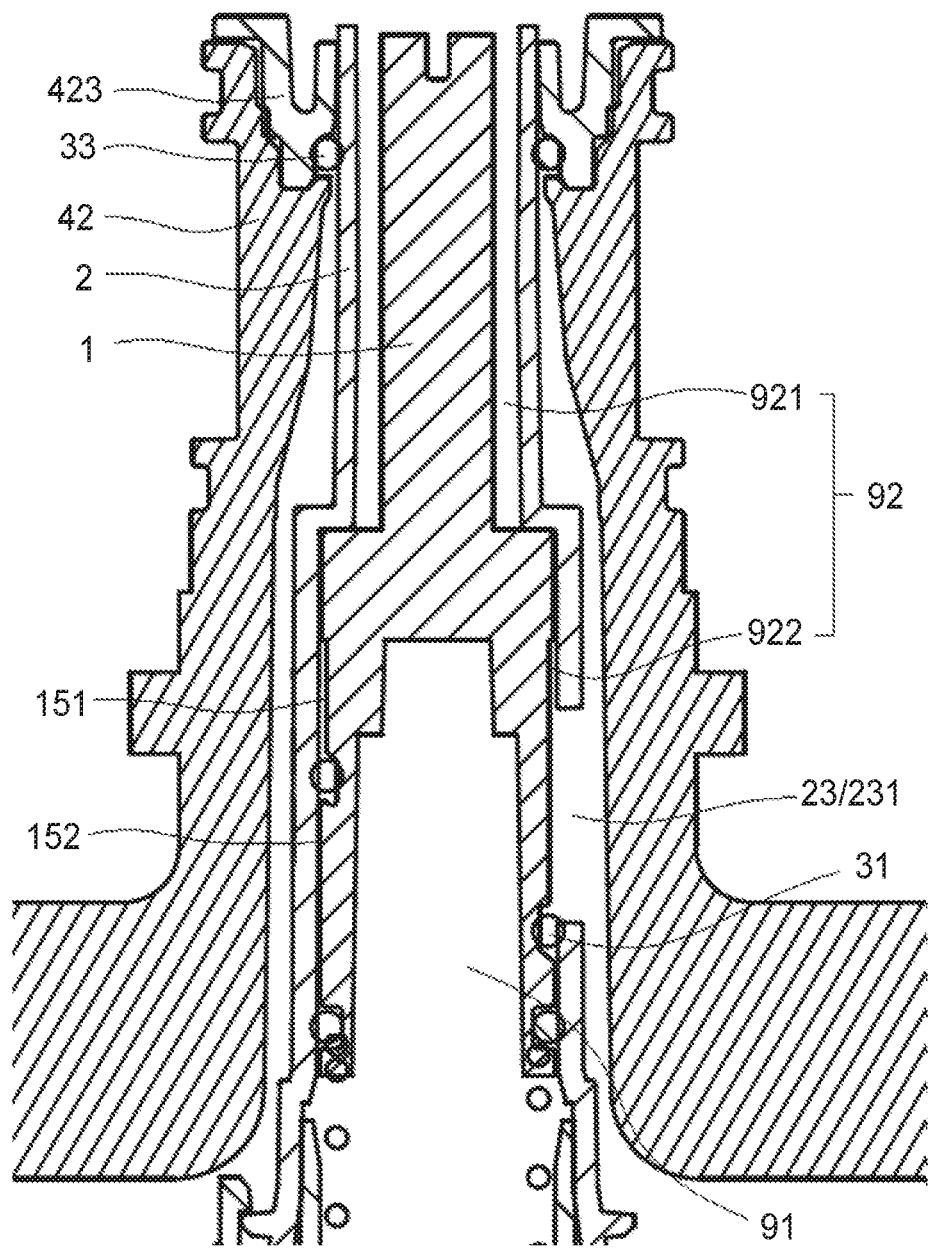
FIG. 11 is a schematic partial sectional structural view illustrating a longitudinal section, along an axis, of the valve core in the water purifier rotating to the state in FIG. 10.

Exemplarily, the states of the valve core 1 rotating to some different positions may be as follows:

When the first alignment mark 18 points to the aforementioned "one-stroke" mark as shown in FIG. 10, the state of the bypass valve is shown in FIG. 11. The bypass opening 23 is completely the bypass channel 231 (for example, the bypass channel 231 accounts for 100% of the area of the bypass opening 23). The bypass valve has the maximum bypass water stream (flow), that is, it has the maximum water stream flowing into the second channel 92 from the bypass opening 23. The second water stream (unpurified water or incompletely purified water) in the water output from the water purifier accounts for the largest proportion.

Figure 12:
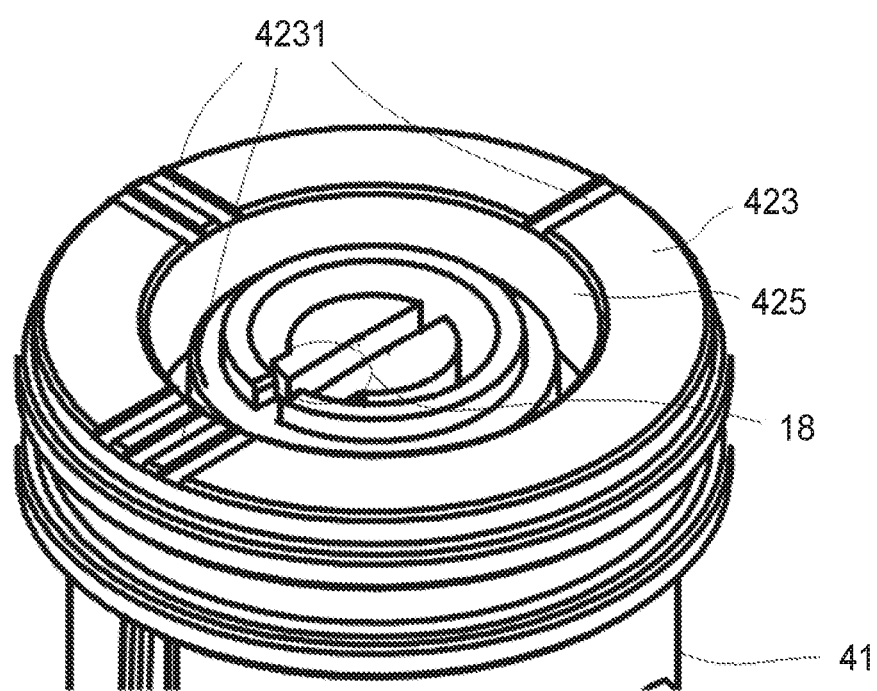
FIG. 12 is a schematic view illustrating a positional relationship between a mark disc and a first alignment mark when a valve core in a water purifier rotates to another state according to an embodiment of the present invention.
Figure 13:
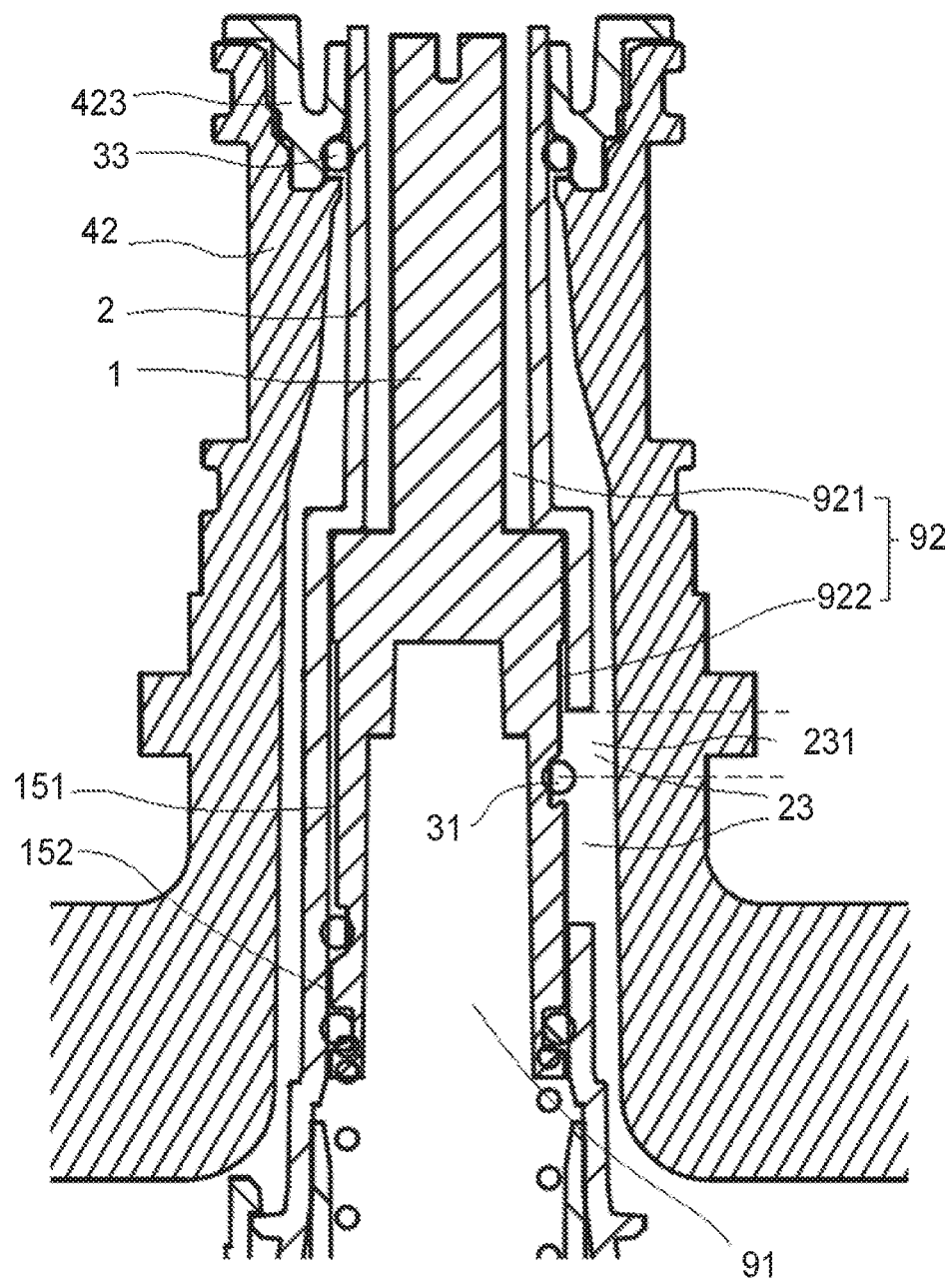
FIG. 13 is a schematic partial sectional structural view illustrating a longitudinal section, along an axis, of the valve core in the water purifier rotating to the state in FIG. 12.

When the first alignment mark 18 points to the "three-stroke" mark exactly opposite to the "one-stroke" mark as shown in FIG. 12, the state of the bypass valve is as shown in FIG. 13. The bypass channel 231 has the smallest area (for example, the bypass channel 231 accounts for 25% of the area of the bypass opening 23); the bypass valve has the minimum bypass water stream (flow); and the second water stream (unpurified water or incompletely purified water) in the water output from the water purifier accounts for the smallest proportion.

Certainly, it should be understood that the maximum and minimum bypass water streams (flows) merely represent two extreme states reachable by the bypass valve. That is, the proportion the bypass channel 231 accounts for in the area of the bypass opening 23 corresponding to the maximum bypass water stream (flow) is not necessarily 100%, while the proportion the bypass channel 231 accounts for in the area of the bypass opening 23 corresponding to the minimum bypass water stream (flow) is not necessarily 0%.

Figure 14:
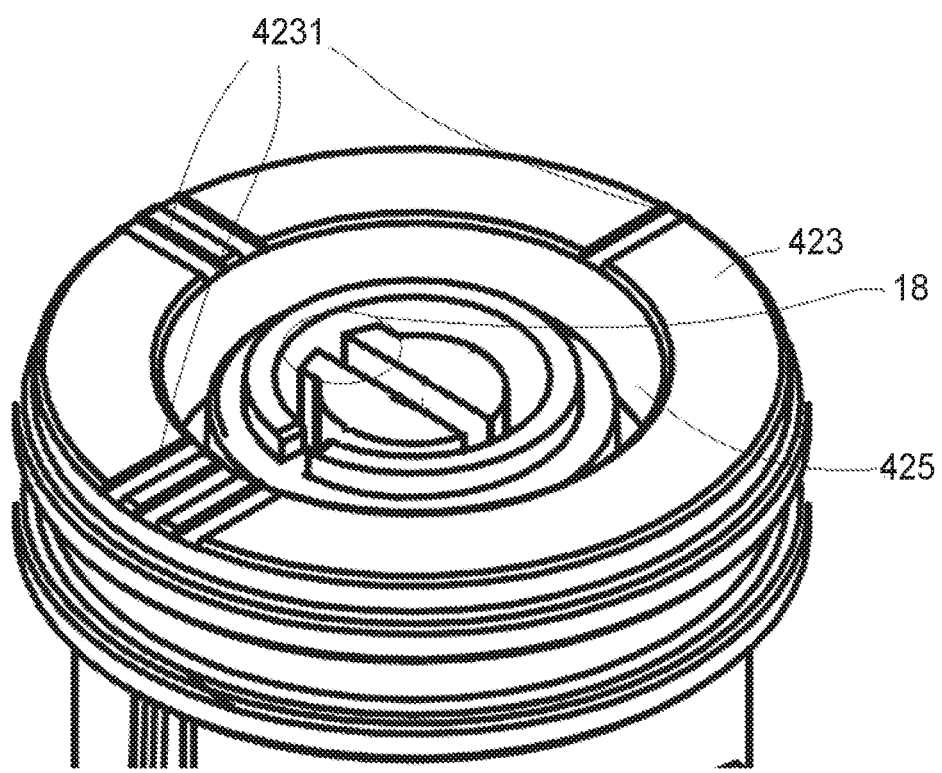
FIG. 14 is a schematic view illustrating a positional relationship between a mark disc and a first alignment mark when a valve core in a water purifier rotates to still another state according to an embodiment of the present invention.
Figure 15:
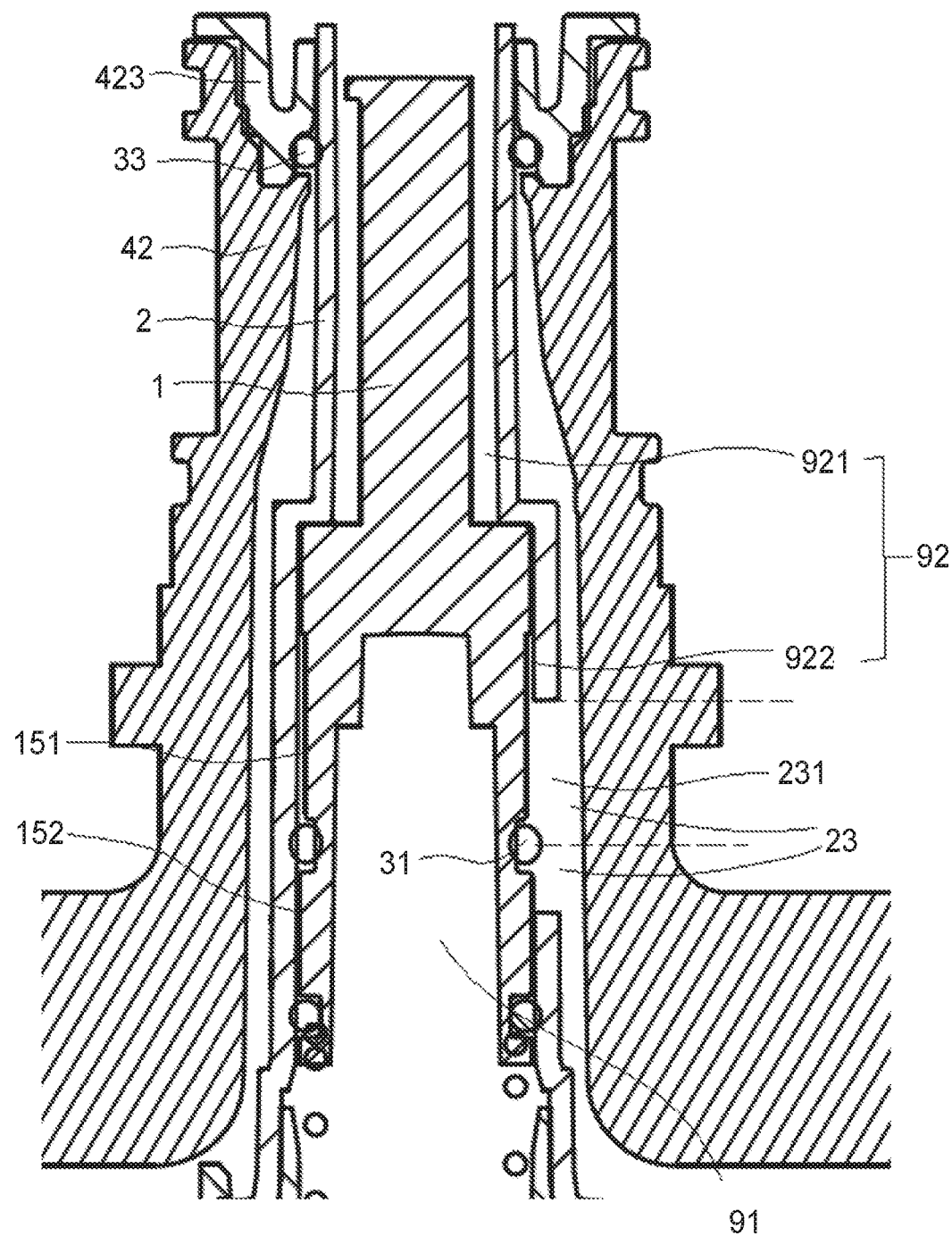
FIG. 15 is a schematic partial sectional structural view illustrating a longitudinal section, along an axis, of the valve core in the water purifier rotating to the state in FIG. 14, wherein the reference numerals are as follows.

When the first alignment mark 18 points to the "second-stroke" mark arranged between the "one-stroke" mark and the "three-stroke" mark as shown in FIG. 14, the state of the bypass valve is as shown in FIG. 15. The bypass channel 231 has an area between the maximum area and the minimum area (for example, the bypass channel 231 accounts for 50% of the area of the bypass opening 23). The bypass water stream of the bypass valve accounts for a ratio (flow) between the maximum bypass water stream (flow) and the minimum bypass water stream (flow), and the second water stream (unpurified water or incompletely purified water) in the water output from the water purifier also accounts for a ratio between the largest proportion and the smallest proportion.

Certainly, it should be understood that when the first alignment mark 18 points to other different positions between the "one-stroke" mark and the "three-stroke" mark, the bypass valve may be adjusted to have any bypass water stream between the minimum bypass water stream and the maximum bypass water stream.

It can be understood that the above implementations are only exemplary implementations employed for illustration of principles of the embodiments of the present invention, and do not limit the embodiments of the present invention. For those of ordinary skill in the art, various variations and improvements may be made without departing from the spirit and essence of the embodiments of the present invention, and these variations and improvements are also considered as falling within the protection scope of the embodiments of the present invention.

The invention claimed is:

1. A bypass valve, comprising a valve core and a valve housing, wherein
the valve core is provided with a first inlet, a first outlet, a first channel, and a first annular seal, the first inlet and the first outlet are disposed at intervals in an axial direction, the first annular seal is fitted on an outer side surface of the valve core between the first inlet and the first outlet, and the first channel is disposed within the valve core and communicates with the first inlet and the first outlet;
the valve housing is provided with a first opening, a second opening, an inner space, and a bypass opening, the first opening and the second opening are disposed at intervals in an axial direction, the inner space communicates with the first opening and the second opening, and the bypass opening is provided on a side wall of the valve housing between the first opening and the second opening and communicates with the inner space and an outer space outside the valve housing;
the valve core is disposed in the inner space of the valve housing and is capable of rotating in the inner space around the axial direction;
the bypass opening and the first circular seal are further configured in such a manner that, when the valve core rotates, the first annular seal is capable of partitioning the bypass opening into two parts, and an axial position of a part of the first annular seal in contact with the bypass opening varies with the rotation of the valve core; and
wherein a gap is formed between the outer side surface of the valve core and an inner side surface of the valve housing, and the first annular seal partitions the gap into two parts, wherein a part of the gap close to the first outlet forms a second channel and the bypass valve is configured in such a manner that a first fluid enters the first channel through the first inlet and then flows into the second channel through the first outlet, a second fluid flows into the second channel through the bypass opening is mixed with the first fluid and then flows out of the bypass valve.

2. The bypass valve according to claim 1, wherein the first annular seal is disposed in an inclined manner with respect to an axial direction of the valve core.

3. The bypass valve according to claim 1, wherein an included angle between the first annular seal and the axial direction of the valve core is greater than 0 degrees and less than 90 degrees.

4. The bypass valve according to claim 1, wherein the first annular seal is a seal ring made of an elastic material.

5. The bypass valve according to claim 1, wherein the outer side surface of the valve core is provided with a first seal ring groove at a position where the first annular seal is disposed, the first annular seal is disposed in the first seal ring groove, and the first annular seal protrudes from the first seal ring groove.

6. The bypass valve according to claim 1, wherein the outer side surface of the valve core further has a second annular seal fitted thereon, the second annular seal partitions a gap between the outer side surface of the valve core and an inner side surface of the valve housing into two parts not in communication with each other, and the second annular seal is arranged between the first inlet and the first annular seal in the axial direction of the valve core.

7. The bypass valve according to claim 1, wherein an axial dimension of the bypass opening is larger than a circumferential dimension of the bypass opening.

8. The bypass valve according to claim 1, wherein the valve core comprises, in the axial direction, a first part and a second part, a radial dimension of the first part is smaller than a radial dimension of the second part, the first inlet is provided in an end of the second part away from the first part, and the first outlet is arranged on an end surface of an end of the second part connected to the first part.

9. The bypass valve according to claim 8, wherein the valve housing comprises, in the axial direction, a third part corresponding to the first part of the valve core, and a fourth part corresponding to the second part of the valve core;
a radial dimension of an inner space of the third part is smaller than a radial dimension of an inner space of the fourth part; and
the bypass opening is provided on a side wall of the fourth part.

10. The bypass valve according to claim 1, wherein an end surface of the valve core away from the first inlet is provided with an operating structure capable of driving the valve core to rotate under an external force.

11. The bypass valve according to claim 1, wherein a end surface of the valve core away from the first inlet is provided with a first alignment mark.

12. A water purifier, comprising a water inlet, a water outlet, a water purification medium, and the bypass valve according to claim 1, wherein
the water purifier is configured in such a manner that in an operating state, at least a part of a water stream flowing in through the water inlet is introduced into the water purification medium for purification to obtain a first water stream, and the first water stream is introduced into the first channel through the first inlet of the bypass valve and then flows into the second channel through the first outlet; a second water stream is introduced into the second channel through the bypass opening; mixed water obtained after the second water stream and the first water stream flowing into the second channel are mixed flows out of the bypass valve, and then the mixed water flows out of the water purifier through the water outlet.

13. The water purifier according to claim 12, wherein the second water stream comes from the water stream flowing in through the water inlet.

14. The water purifier according to claim 12, wherein the water purification medium comprises a first purification medium and a second purification medium, and the second water stream comes from an incompletely purified water stream purified by the first purification medium but not purified by the second purification medium.

15. The water purifier according to claim 12, further comprising a valve seat, the valve seat having a through hole running therethrough, the bypass valve is fixedly connected to the valve seat, and the through hole communicates with the first inlet of the bypass valve and a purified water outlet of the water purification medium.

16. The water purifier according to claim 15, wherein the water purifier further comprises a tubular member, wherein one end of the tubular member is the purified water outlet, and the other end is disposed in a purification space where the water purification medium is located.

17. The water purifier according to claim 15, wherein the water purifier further comprises an elastic member, wherein one end of the elastic member makes contact with an end surface of the valve core where the first inlet is located, and the other end makes contact with the valve seat, so as to apply an elastic force directed to the first outlet to the valve core.

18. The water purifier according to claim 12, wherein the water purifier further comprises an alignment mark structure, the alignment mark structure is unrotatably fitted on an end of the valve housing away from the first inlet of the valve core and comprises at least two second alignment marks.

19. The water purifier according to claim 18, wherein the water purifier is configured in such a manner that in the operating state, when the first alignment mark is aligned with one of the second alignment marks, the bypass valve has a maximum bypass water stream; when the first alignment mark is aligned with the other of the second alignment marks, the bypass valve has a minimum bypass water stream, and the bypass water stream is a water stream entering the second channel through the bypass opening.

20. The water purifier according to claim 18, wherein the water purifier is configured in such a manner that in the operating state, the bypass valve is adjustable to have any of the bypass water streams between a minimum bypass water stream and the maximum bypass water stream, and the bypass water stream is a water stream entering the second channel through the bypass opening.

21. The water purifier according to claim 12, wherein the water purification medium comprises ion-exchange resin particles, and the water purifier is capable of softening water streams.

\* \* \* \* \*